United States Patent [19]

Heinrich

[11] Patent Number: 4,788,635
[45] Date of Patent: Nov. 29, 1988

[54] CONVERTER SYSTEM COMBINING A TWO-QUADRANT VOLTAGE-SOURCE RECTIFIER AND A FOUR-QUADRANT VOLTAGE-SOURCE INVERTER, AND A MOTOR DRIVE EMBODYING THE SAME

[75] Inventor: Theodore M. Heinrich, Murrysville, Pa.

[73] Assignee: Westinghouse Electric Corp., Pittsburgh, Pa.

[21] Appl. No.: 126,056

[22] Filed: Nov. 27, 1987

Related U.S. Application Data

[63] Continuation-in-part of Ser. No. 10,879, Feb. 4, 1987, abandoned, which is a continuation-in-part of Ser. No. 807,568, Dec. 11, 1985, abandoned.

[51] Int. Cl.$^4$ ............................................... H02P 3/20
[52] U.S. Cl. ..................................... 363/35; 363/37; 318/762; 318/803
[58] Field of Search .................. 363/35, 37, 51, 124; 318/376, 762, 800, 801, 802, 803

[56] References Cited

U.S. PATENT DOCUMENTS

| | | | |
|---|---|---|---|
| 4,272,807 | 6/1981 | Gallagher | 363/126 |
| 4,353,023 | 10/1982 | Kawada | 318/762 |
| 4,375,612 | 3/1983 | Wirth | 318/767 |
| 4,434,393 | 2/1984 | Kobari | 318/757 |
| 4,459,492 | 7/1984 | Rogowsky | 307/82 |
| 4,554,999 | 11/1985 | Kamaike | 318/376 |

OTHER PUBLICATIONS

Peter Wood–*Switching Power Converters*, Van Nostrand, pp. 41–44.

Primary Examiner—Peter S. Wong
Attorney, Agent, or Firm—C. M. Lorin

[57] ABSTRACT

In an AC motor drive, a voltage-source inverter is provided in the DC-link thereof with a GTO switching arrangement which upon braking allows matching the voltage, current domains for the forward power and regeneration modes, the GTO devices being interrupted with a duty cycle selected in response to the voltage difference between the inverter DC input voltage and a constant reference voltage.

1 Claim, 6 Drawing Sheets

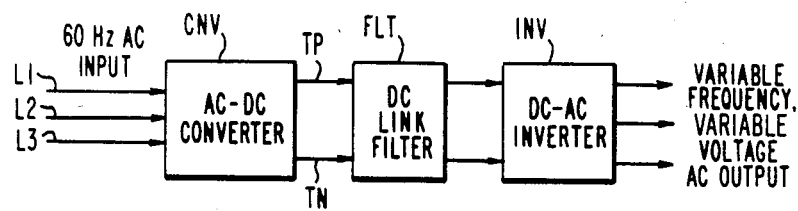
FIG. 1
PRIOR ART
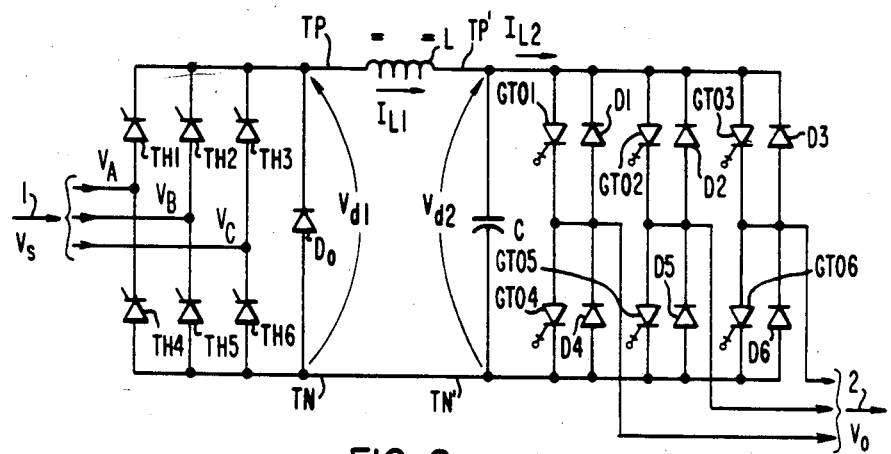
FIG. 2
PRIOR ART
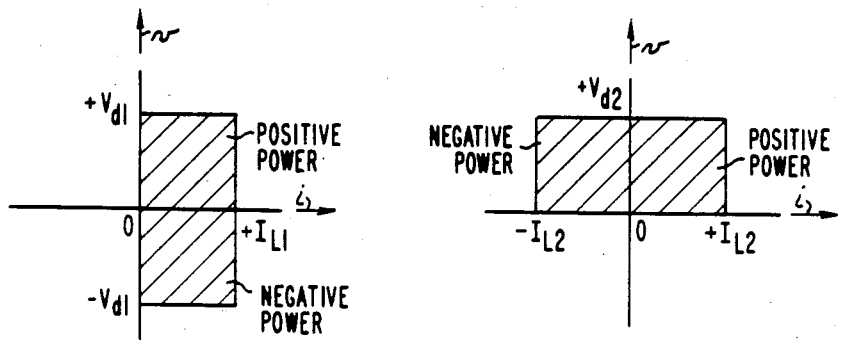
FIG. 4A
PRIOR ART
FIG. 4B
PRIOR ART

4,788,635

CONVERTER SYSTEM COMBINING A TWO-QUADRANT VOLTAGE-SOURCE RECTIFIER AND A FOUR-QUADRANT VOLTAGE-SOURCE INVERTER, AND A MOTOR DRIVE EMBODYING THE SAME

This application is a continuation-in-part of application Ser. No. 10,879 filed Feb. 4, 1987, which was a continuation-in-part of application Ser. No. 807,568 filed Dec. 11, 1985, (now abandoned) by the present inventor and owned by the present assignee.

The present patent application is related to U.S. Pat. No. 4,697,131, issued Sept. 29, 1987, for "Improved Voltage Source Inverter and Variable Frequency, Constant Voltage AC Motor Drive Embodying the Same" incorporated by reference.

BACKGROUND OF THE INVENTION

A voltage-source inverter includes an AC/DC converter supplying a DC voltage to the inverter through a DC-link including a capacitor and an inductance, as generally known. The AC/DC converter and the inverter are both generally in the form of a bridge including static power switches connected across the DC terminals and the AC lines.

Voltage-source inverters with fixed voltage DC links are increasingly being used in high performance motor drive applications. Typically, such motor drives operate through the four quadrants in terms of positive or negative current and motoring or regenerating mode. However, the DC link is commonly supplied from a single-quadrant rectifier bridge, i.e. not accepting energy returned from the motor when braking, thus not returned to the AC power supply.

In a modern voltage-source inverter controlled motor drive, the drive is inherently capable of operating in four quadrants of the speed-torque plane. The first quadrant is where both speed and torque are positive. The third quadrant is where both speed and torque are negative. Thus, in those two instances the product torque speed is positive. This is when power flow goes into the mechanical load of the motor. In contrast, the second and fourth quadrants are those where the product torque times speed is negative, i.e. when the motor is acting as a generator and power is flowing from the mechanical load through the motor and back to the inverter side of the drive.

The problem is that in a voltage-source inverter, which can accept return power flow, the power can flow back through the inverter to the DC-link capacitor, but not back through the AC/DC converter. In other words, instead of a single-quadrant rectifier bridge, a two-quadrant power converter is required.

The prior art shows power circuits and control schemes which can be used to obtain two-quadrant power conversion, in a voltage-source inverter motor drive. See for instance U.S. Pat. Nos. 4,353,023 and 4,434,393 using an antiparallel regenerative thyristor bridge circuit connected between the inverter and the rectifier through switching transistors fired in synchronism with the thyristors. This approach requires at least six additional thyristors and associated control, which is a costly solution. A more simple solution has been proposed to deal with the negative flow of power into the DC-link from the inverter, consisting in using a resistor-chopper. This solution, however, because it employs a resistor, is cost effective, but has an adverse impact on efficiency and it causes enclosure temperatures to rise.

The prior art also shows a voltage-source inverter in which the rectifier bridge has its DC output connected to the respective poles of the DC link capacitor via respective diodes, and in which two thyristors are connected for cross-coupling between the two poles of the DC link capacitor. See U.S. Pat. No. 4,375,612 of Wirth.

In the cross-referenced patent application, instead of two cross-coupled thyristors, one GTO device is combined with one thyristor, whereby in the regenerative mode upon turning off the GTO device the freewheeling current through one diode and the added thyristor is rapidly forced to zero by the negative supply voltage returning the inductive energy to the AC side of the rectifier. Accordingly, a totally no-current situation is created involving the added thyristor, thereby allowing recovery time before proceeding with the next thyristor commutation in the bridge.

SUMMARY OF THE INVENTION

The invention is applicable to a voltage-source inverter (VSI) motor drive operating through the four voltage-current quadrants, i.e. involving regenerative mode operation by controlling the VSI on the AC input side so as to reverse the DC-link polarity thereof, while switching across the DC-link terminal connections to the inverter side thereof so as to match the polarities.

The invention resides in the implementation of such matching of polarities with cross-coupled GTO devices associated with the two diodes coupled with the respective poles of the DC-link capacitor between the output of the rectifier thyristor bridge and the DC-link terminals of the voltage-source inverter motor drive. To this effect, the GTO devices are interrupted with a duty cycle selected in response to the voltage difference between the inverter DC input voltage and a constant reference voltage.

BRIEF DESCRIPTION OF THE DRAWINGS

FIG. 1 is a voltage-source inverter (VSI) as can be used for variable frequency variable voltage supply of a motor drive;

FIG. 2 shows the internal organization of a VSI like in FIG. 1;

FIG. 4A, shows the (voltage, current) output domains (first and second quadrants) of the AC/DC converter of FIGS. 1, or 2; FIG. 4B shows the (voltage, current) input domains (first and fourth quadrant) of the DC/AC inverter of FIGS. 1, or 2;

DETAILED DESCRIPTION OF THE INVENTION

FIG. 1 shows a voltage-source inverter (VSI) including: 60 Hz AC power supply at the input (phases A, B, C) from lines 1; an AC/DC converter CNV rectifying the AC current; a DC-link having a positive terminal TP, a negative terminal TN and a DC-link filter FLT (consisting in an inductor and a capacitor); and a DC/AC inverter INV providing on output lines 2 a variable frequency, variable voltage AC output as controlled by the inverter INV, and the converter CNV.

FIG. 2 shows the VSI of FIG. 1 in a specific embodiment. The converter CNV is a thyristor bridge mounted across the AC lines of line voltages VA, VB, VC at the standard frequency $f_s$. The DC-link includes a diode $D_o$ across the terminals TP, TN. The filter includes a reactor L and a capacitor C, the latter across the input lines of the inverter INV. The inverter has three poles each consisting of two GTOs in series across the DC-link terminals and of antiparallel diodes. GTO-1–GTO6 are the GTOs, D1–D6 the diodes. From the three poles a variable AC voltage $V_o$ is derived on lines 2.

Referring to FIG. 2, the thyristors TH1–TH6 are controlled with a firing angle which leads to a DC voltage $V_{d1}$ between the DC-link terminals TP and TN. The voltage is $V_{d2}$ across the capacitor C, thus, between TP' and TN' at the input of the inverter INV. If lines 2 are applied to the stator of an induction motor asserting a torque on a mechanical load, power is derived from the converter in the form of a DC current $I_{L1}$ across the reactor L, and a DC current $I_{L2}$ into the inverter INV. This is known as the "motoring" mode of the motor drive, power flow goes into the mechanical load of the motor. This occurs whether the motor is running in one direction, or the other, while exerting an active torque upon the load. Torque and speed may, thus, be both positive, or both negative. In each instance, the product of torque by speed is positive. When running in the negative direction (reverse rotation), the motor is supplied from terminals of the same opposite polarities (TP', TN' on FIG. 2), but the inverter is controlled so that the phase lines 2 exhibit voltage and current vectors rotating in the opposite direction.

Should braking occur against either direction of rotation, the product of the torque by the speed becomes negative. The motor is now acting as a generator and power is flowing from the mechanical load through the motor and back into the inverter INV. Considering FIG. 2, the power can flow back through the inverter to the DC-link capacitor C, but it cannot flow back through the AC/DC converter CNV, because the converter cannot accommodate a negative load current. If the diode $D_o$ is removed, and the polarities of the terminals TP, TN may be exchanged, and in principle the AC/DC converter will be able to pass power back to its AC side.

Figure 3A:
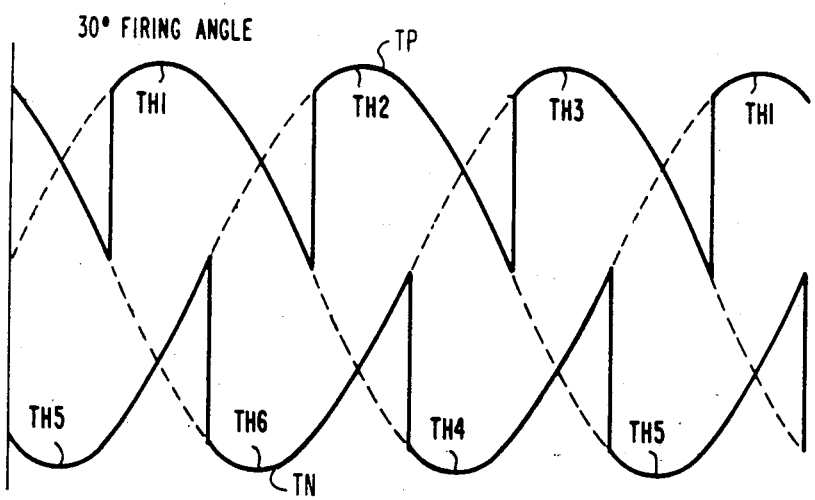
FIGS. 3A, 3B illustrate with curves for firing angles, of 30° and 150°, respectively, the generation of a DC-link voltage at the output of the converter for a positive and a negative voltage, respectively.
Figure 3B:
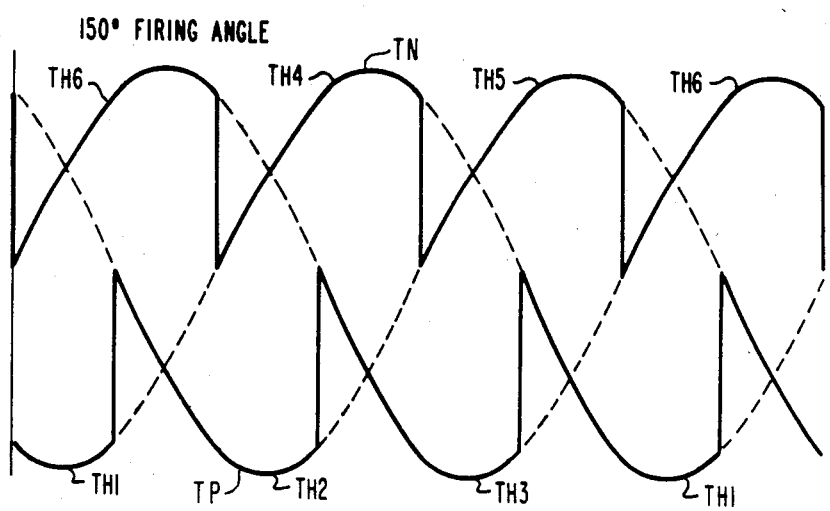

The negative polarity becomes TN on terminal TP and the positive polarity becomes TP on terminal TN by controlling TH1–TH6 as shown in FIG. 3B, i.e. with a firing angle close to 180°, in practice a 150° firing angle may be used. Thus, the converted AC voltage becomes a DC-link voltage which is negative, as opposed to the DC-link voltage in the 30° firing angle situation of FIG. 3A. Still, to pass power back to the AC through the converter the inverter input characteristic maintains a unipolar voltage, namely positive, while being forced to pass current in one (motoring) or the other (braking) direction.

FIG. 4A illustrates for the first and second quadrants the AC/DC converter the (voltage, current) output domains for a two-quadrant operation (diode $D_o$ of FIG. 2 being removed to allow operation in the quadrant with a positive terminal TN, and a negative terminal TP i.e. $V_{d1}$. FIG. 4B illustrates for the first and second quadrants the DC/AC inverter input domains for a two-quadrant operation (the polarity of the DC-link terminals TP, TN being the same for both quadrants, the currents being $I_{L2}$ positive in the first quadrant, negative in the fourth quadrant).

Figure 5:
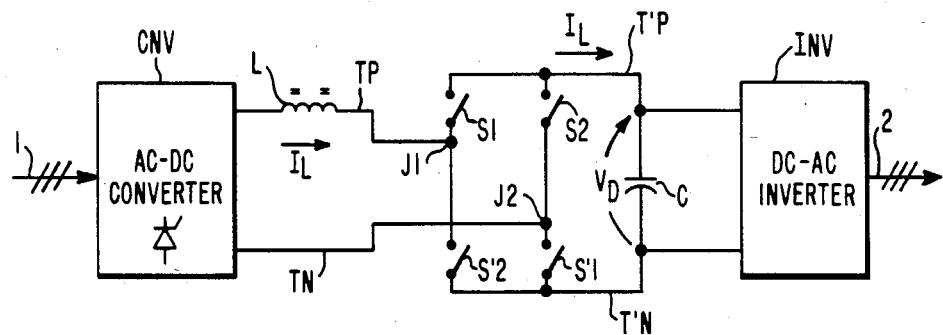
FIG. 5 is a prior art VSI.

In order to overcome this incompatibility between the domains of FIG. 4A and FIG. 4B, a switching arrangement has been provided in the DC-link allowing the functions at the output of the AC/DC converter to be matched with the input of the DC/AC inverter. Such switching arrangement is illustrated in FIG. 5 by DC-link terminals (TP, TN) at the output of the AC/DC converter such can be either directly connected to terminals T'P and T'N (and the two ends of capacitor C) of the DC/AC inverter, or connected cross-wise thereto. Terminal TP, beyond reactor L, goes to a junction power J1 which, by switch S1, leads to terminal T'P at the input of the inverter and, by switch S2, leads to terminal T'N at the input of the inverter. Similarly, terminal TN goes to junction point J2 which by a switch S2, leads to terminal T'P and, by a switch S1, leads to terminal T'N. When switches S1 and S'1 are closed, while switches S2, S'2 are open, TP is connected to T'P while TN is connected to T'N. This is the normal situation (first quadrant of RCT, and first quadrant INV). When regenerating (negative current - $I_{L2}$, and fourth quadrant for INV), the negative voltage is achieved upon the AC/DC converter while inverting the connections TP, TN through closed switches S2, S'2 (switches S'1, S1, being open). At the same time, in this case, the AC/DC converter is with a 180° firing angle so as to create a negative voltage at the output of the converter. Accordingly, energy from the inverter ($I_L$) can flow back to the AC side of the converter.

Figure 6:
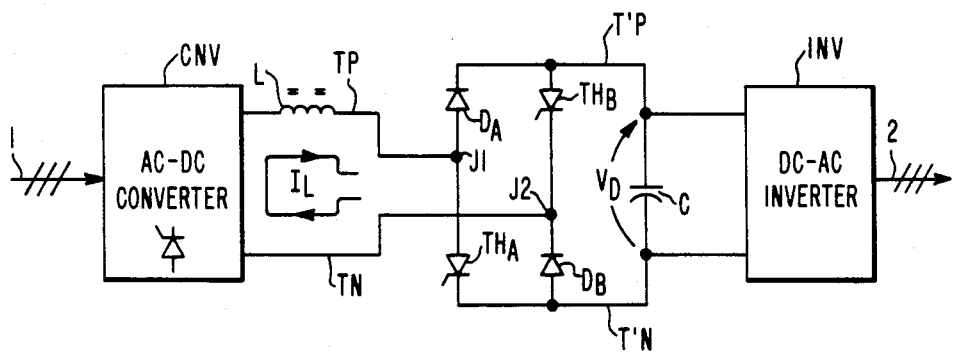
FIG. 6 is a solid state implementation of the switching arrangement included in the VSI of FIG. 5.

FIG. 6 shows a prior art solid state implementation of the switching arrangement of FIG. 5. Switch S1 is here a diode DA, switch S'1 is a diode DB, switch S2 is a thyristor THB and switch S'2 is a thyristor THA.

As shown in FIG. 6, when power flow is positive (motoring), thyristors THA and THB are "off" and a DC-link current IL flows through diodes DA and DB to the inverter. When negative power flow is required (regeneration), thyristors THA and THB are turned "on". Capacitor C at the input to the inverter commutates the diodes. Now load current flows through the inductor L, with the same polarity as when motoring, through the thyristors THA and THB, but through the input terminals of the VSI with opposite polarities. The voltage across capacitor C, must be "matched" by the AC-to-DC converter output in order to maintain the average voltage drop across the inductor L to the value prescribed by its IR drop. This is done by phasing on the converter CNV the firing of the thyristors back towards the inversion end-stop. When the firing angle delay is so oriented, the output voltage of the AC-to-DC converter CNV is reversed (see illustration in FIG.

3B), whereby the polarity of the current has remained unchanged. Power now flows from the inverter back through the AC-to-DC converter CNV and into the mains of line 1.

When transition back to motoring operation is to be made, the inverter input current becomes positive again. As a result, the DC-link capacitor voltage begins dropping, because positive current cannot be supplied to the inverter-capacitor through thyristors THA-THB. The current through thyristors THA-THB and inductor L now becomes discontinuous and the removal of the gate drive signal from thyristor THA-THB allows them to be turned "off". Diodes DA and DB are now free to conduct, thus, reconnecting the AC-to-DC converter CNV with the proper polarity to allow motoring operation. The phase delay firing angle for converter CNV can now be moved forward (see illustration of FIG. 3A) towards the rectification end-stop, as required in order to maintain the proper voltage drop across inductor L.

In order to insure that the above sequence of events takes place as described, the value of the DC-link capacitor C should be large and the value of the DC-link inductor L small, that is to say, the DC-link current $I_L$ should become discontinuous before capacitor C discharges appreciably. Normally, this is the case in this type of inverter due to the relatively high cost of the inductor.

Figure 7:
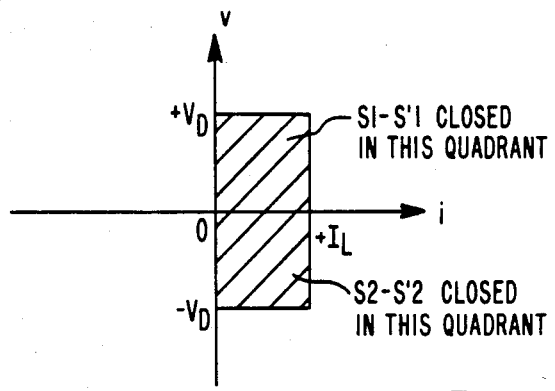
FIG. 7 shows the switch conduction domains at the output of the AC/DC converter of FIG. 6.

FIG. 7 shows the matched switch conduction domains of the first and second quadrants at the output of converter CNV.

Figure 8:
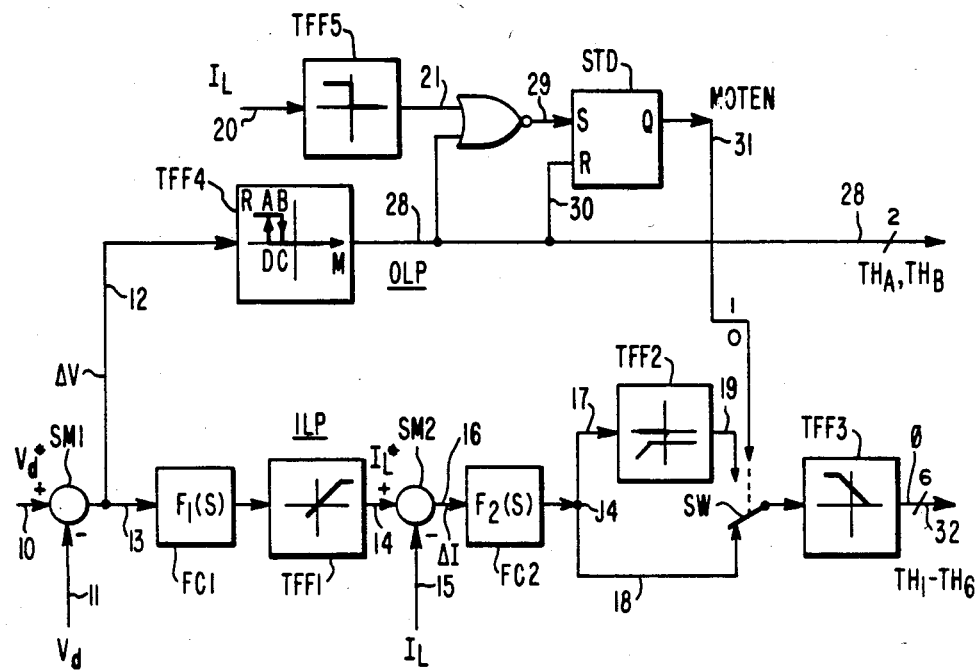
FIG. 8 is a block diagram illustrating control implementation of the solid state circuit of FIG. 6.

FIG. 8 is a functional block diagram of a possible control circuit which implements the control actions in the context of FIG. 6. Two basic control loops are shown: an outer voltage loop and an inner current looper for DC-link control. The voltage error signal $\Delta V$ on line 12 (outer loop) initiates transfer by bistable device STD and logic signal MOTEN on line 31 from motoring to regeneration when the voltage error, $\Delta V$, becomes sufficiently negative. The combination of transfer functions TFF2 and TFF3, insures that the firing angle, $\phi$, is restricted to $\pi/2$, or a greater delay, thereby to provide a negative output from the AC-to-DC converter when regenerating.

Referring specifically to FIG. 8, thyristor control and mode selection between motoring and regenerating for the circuit of FIG. 6 are shown in block diagram.

An outer loop brings on line 11 a feedback signal representative of the voltage $V_d$ across the DC-link capacitor at the input of the inverter. The signal of line 11 is compared to a reference signal $V_d$ received from line 10. A frequency sensitive compensation circuit FC1 receives the error signal $\Delta V$ derived on line 13 by summer SM1 in response to lines 10 and 11. The function $F_1(S)$ within circuit FC1 provides an output signal representative of the DC-link current required to compensate for the voltage error on line 13. This signal is passed through a limiter TFF1 which outputs on line 14 the reference current $I_L$ for the DC link reactor current. An inner loop provides on line 15 a signal representative of the existing DC link reactor current $I_L$. A summer SM2 provides on line 16 the error $\Delta I$ between $I_L$ and $I_L$. Another frequency compensating circuit FC2 (characterized by a function $F_2(S)$) provides on line 18 the firing angle required for the thyristors TH1-TH6 to produce such desired DC link current in the motoring mode. The motoring mode is effective when there is a ONE on line 31 from the mode selector and switch SW occupies the position shown in FIG. 8, i.e., line 18 inputs into transfer function TFF3.

In the regenerating mode, line 31 carries a zero and switch SW is positioned with line 19. Then, the firing angle from line 17 is brought back by an amount defined by transfer function TFF2. It is observed that transfer function TFF3 limits such backward action in the regenerating mode.

Considering now the mode selection, the mode selector consists essentially of a transfer function TFF4 and a solid state device providing at its output Q a ONE when set on line 29, a zero otherwise, the ONE Logic being for motoring enable (MOTEN=1), and zero for regenerating enable (MOTEN=0). Function generator TFF4 is transferring from the regenerating mode to the motoring mode along RABCM, whereas transferring back to the motoring mode is by MCDAR, as shown in block TFF4. The output on line 28 goes to the gating circuit of THA, THB, thereby ensuring a corresponding switching between terminals TP, TN and TP', TN' as explained earlier by reference to FIG. 6 while applying on line 32 through the gating circuit of (TH1-TH6) a firing angle defined by TFF3 and SW.

The transition back (set state on STD) to motoring is allowed only after the current ($I_L$ on line 20) through the thyristor is zero and when a positive voltage error is called for (transfer function TFF5).

To prevent this, on line 20 a feedback signal representative of $I_L$ is applied to a transfer function TFF5 which logically expresses on its output (line 21) that the required condition has been satisfied. This, while line 28 through an OR device and line 29 may require the system on the S input of STD to return to motoring, the state of line 29 from line 21 through the OR device and line 29 will prevent it until $I_L$ is clearly zero, as a critical event, thus, allowing return to motoring.

With thyristors as the additional switches, there is a practical limitation on the amount of negative voltage available from the AC-to-DC converter CNV as compared to the positive voltage. This negative voltage is invariably less in magnitude than the positive magnitude due to the margin angle (inversion end-stop) which must be allowed to assure proper transfer of current from one converter thyristor to the next. This mismatch between positive and negative AC-to-DC converter output voltages can be solved simply by restricting the rectification delay angle such that positive and negative voltages match one another. This is a practice commonly employed when AC-to-DC converters are used in conjunction with DC motor drives. Operating the converter in this manner imposes a slight penalty in the utilization of the AC-to-DC converter thyristors.

However, there are two more significant disadvantages. The delay of firing in the rectification mode leads directly to an input converter power factor which is less than unity for all motor drive modes of operation. The second disadvantage is that the reduction of voltage in the motoring mode means that the drive cannot be rated to have the same input and output voltage rating. This implies an underutilization of a motor which was designed to operate from standard mains voltage.

Figure 9:
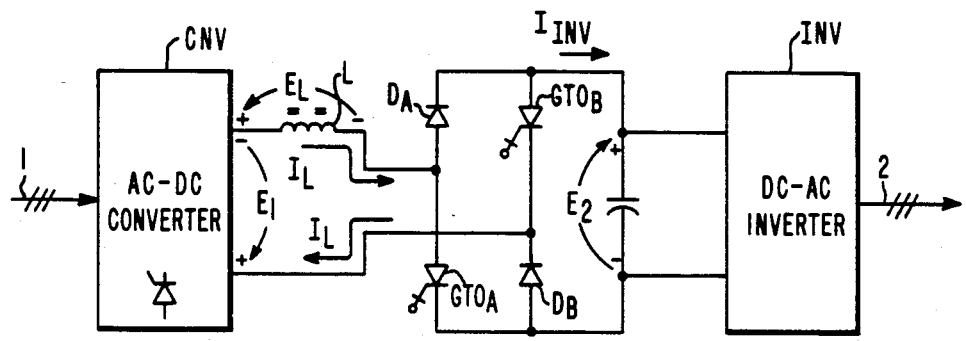
FIG. 9 shows the VSI according to the invention, characterized in that GTOs are used to implement the switching arrangement of FIG. 5.
Figure 10:
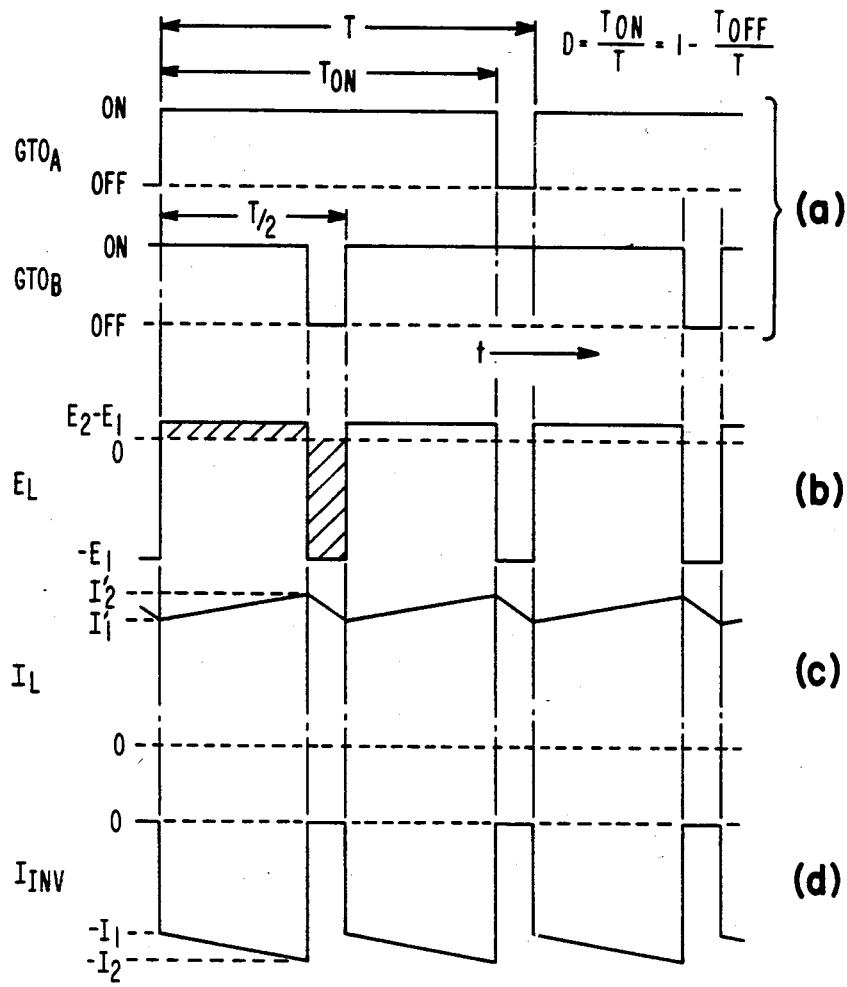
FIG. 10 are curves showing the gating states of the GTOs of FIG. 9 and the ensuing DC-link voltage and current operational characteristics of the system according to the invention.

Referring to FIG. 9, instead of thyristors THA, TH3, the switching arrangement according to the present invention makes use of GTOs, namely GTOA and GTOB. This is done in order to take advantage of the interruption capability of the GTO device in the context of an AC motor drive forced to go into the regenerating mode, as explained hereinafter. As shown illustratively by curves (a) of FIG. 10, conduction is interrupted cyclically for each GTO device every ⅓ of the fundamental frequency of period T, the two devices being by a T/2 time staggered from one another. This interruption will cause, each time, a short duration decay of the current forced to the voltage level −E1, as shown by curve (b). The duration of this no-conduction state is chosen so as to compensate for the positive voltage (E2−E1), existing the rest of the time in the duty cycle. Accordingly, the two areas (shown in shade) defined by levels (E2−E1) and E1 are made equal. This means that the voltage $E_L$ across the reactor L has a zero average. Curves (c) and (d) of FIG. 10 show the resulting currents on the reactor L (current IL in the reactor varies between I'1 and I'2 in direct relation with the current drawn from the inverter INV during regeneration, namely −I1 and −I2, to be fed back through the AC/DC converter. Because of this compensation, the voltage E1 is matched with the voltage E2. Therefore, instead of having to decrease the rating on the motor drive and inverter side in order to avoid the discrepancy, maximization of the utilization of the inverter and motor has become possible. Another advantage follows when returning to the motoring mode since, with GTOs, there is no delay necessary when returning to the normal operation of the two diodes DA and DB under commutation of the main thyristors of the AC/DC converter bridge. Once motoring at base speed, or above, the AC/DC converter CNV with its thyristors would be producing as much positive voltage as possible (the firing angle delay being substantially zero degree). In the motoring mode, the additional thyristors of FIG. 6, like the GTOs of FIG. 9, are OFF and current flows from the AC/DC converter CNV to the inverter INV through the diodes DA, DB.

When braking occurs and regenerating operation is necessary, the thyristors of the AC/DC converter CNV are phased-back as much as possible (like for the FIG. 8 situation), subject to the commutation limitations, for instance by using an end-stop delay of say 154°. In this instance, the AC/DC converter produces a negative voltage which is proportional to the cosine of 154°, instead of cos (the commutation losses being neglected). This means that the inversion voltage magnitude during braking will be less (typically by about 10%) than the inversion voltage magnitude during motoring. This discrepancy is shown by the voltage (E2−E1) under curve (b) of FIG. 10. To summarize the duty cycle of the GTO devices GTOA and GTOB provides matching. The duty cycle D is chosen less than 100% so as to match the converter voltage E1 with the unipolar inverter input voltage E2, whereby power flows negatively, thus back to the AC/DC converter, hence into the AC source.

The duty cycle is given by:

$$D = \tfrac{1}{2}(1 + E1/D2)$$

where D, E1, and E2 are as shown in FIG. 10. For illustration purposes, the value of D may be 0.95.

To return to the motoring mode, the GTO's are turned OFF and the AC/DC converter firing angle is returned to the rectification end-stop.

Indeed, instead of using GTOs, as GTOA and GTOB of FIG. 9, transistors, or any other solid-state devices having a turn-OFF capability, may be used with the same results.

As a practical matter, control of a GTO network like in FIG. 9 will be simpler than the thyristor version of FIG. 6 because switch transitions can be made without regard to current zeroes in the DC-link inductor L, even though the use of GTO's and the concomitant drive circuitry may be more expensive than the thyristor network approach.

Figure 11:
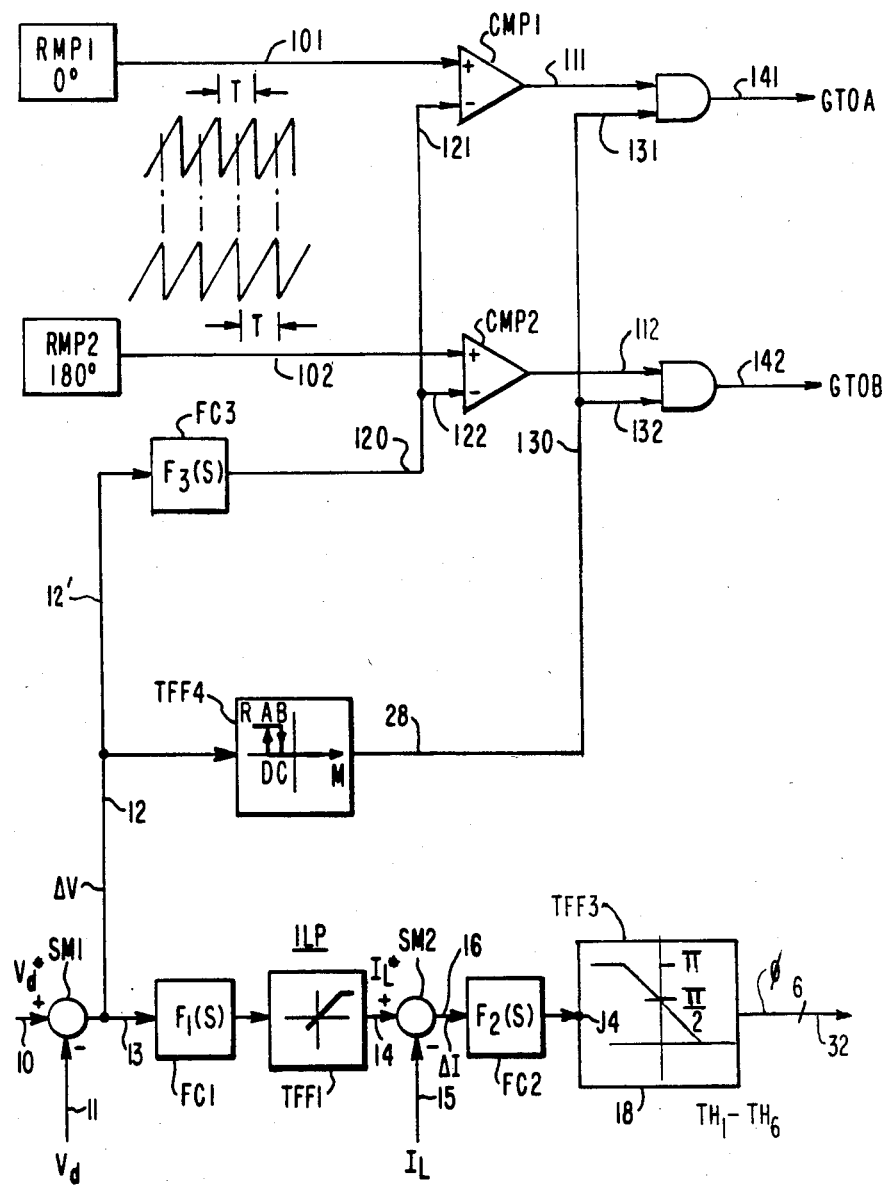
FIG. 11 is a block diagram showing control of the GTOs according to the operation illustrated in FIG. 10.

Referring to FIG. 11, a control system for the GTO devices of FIG. 9 in accordance with the operation described by reference to FIG. 10 is illustrated in block diagram.

Mode selection between motoring and regeneration depends upon the voltage Vd which is representative of the voltage across the DC-link capacitor C, thus, of the voltage E2 thereacross (FIG. 9). $V_d^*$ is a reference voltage, that is, a voltage representative of the normal voltage between the DC-link terminals, i.e., when the motor drive in its forward mode operates according to its inverter and motor ratings. As soon as braking occurs from the motor side, current from the motor side tends to charge the DC-link capacitor C with the result that voltage Vd of line 11 tends to increase. This occurrence is detected in the form of a negative error in relation to the reference voltage $V^*_d$ of line and the error is carried onto lines 12 and 13.

When braking occurs, the DC-link voltage Vd (line 11) becomes larger than the reference voltage $V^*_d$ of line 10. Then, the error ΔV of lines 12, 13 has become negative. As a result, beyond function generator FC1 and transfer function TFF1, the reference current $I^*_L$ of line 14 is lowered and function generator FC2 outputs on line 17 a negative input onto transfer function TFF3 which saturates, so that the firing angle control signal of lines 32 to the thyristors phases back the converter to the inversion end-stop. At the same time, the same negative error ΔV on line 12 causes by transfer function TFF4 a logic ONE to appear on lines 28, 130, 131 and 132, thereby enabling the outputs of lines 111 and 112 from comparators CMP1 and CMP2 to establish a duty cycle for the GTO's according to the function of block FC3, namely under the regenerating mode of operation.

Conversely, when returning to the forward, or motoring mode, the DC-link voltage Vd (line 11) becomes smaller than the reference voltage $V^*_d$ (line 10) and firing angle control of the thyristors is resumed by line 17 according to the feedback current $I_L$ of line 15 and the reference current $I^*_L$ of line 14. At the same time, the positive value of ΔV on line 12 causes a logic Zero to appear on lines 130, 131 and 132, thus preventing GTO control from lines 111 and 112 onto lines 141 and 142. During regeneration, GTO duty cycle control, according to the present invention, by reference to FIG. 10 and FIG. 11 is as follows:

Two ramp generators RMP1 and RMP2 are associated with GTOA and GTOB, respectively. The two ramps are at the frequency of the firing sequence, i.e., of the alternance of firing of the two GTOs, and they are at 180° phase shift from one another. The error ΔV of line 12 is by line 12' inputted into a frequency compensation network FC3 having a function F3(s) defining the duty cycle, thus, based on the ratio E1/E2 defined by signal ΔV. The outputted signal, on line 120, is applied (by lines 121 and 122, respectively) to respective comparators CMP1 and CMP2 which also respond, on respective lines 101 and 102, to ramps RMP1 and RMP2. The comparators are set in accordance with the reference signal appearing on line 120 for a duration defined by the level of the reference of line 120 onto the curves of lines 101, 102. The time of conduction appears on respective output lines 111 and 112. Firing of GTOA and GTOB will be conditioned by being in the regeneration mode, thus, by lines 130, 131 and 132 having the logic one. GTOA is controlled by line 141 from one AND device, whereas GTOB is controlled by line 142 from another AND device. It is clear that when there is a ONE on lines 130, 131 and 132 and a ONE on line 111, or line 112, the corresponding GTO will be by line 141, or line 142, controlled for conduction in accordance with curves (a) of FIG. 10.

As an alternative approach to the problem solved therein, it is now suggested that a single-quadrant buck converter as shown in *Switching Power Converters*, pages 41–44, by Peter Wood (Van Nostrand), could be used instead.

I claim:

1. In an AC motor drive system including:
an AC/DC converter having AC input lines, opposite poles and main thyristors forming a bridge across respective said AC input lines and across said poles; a constant voltage-source inverter having AC output lines and DC terminals; a DC-link capacitor across said inverter DC terminals; and an AC motor energized by said AC output lines;
the combination of:
first and second diode means operatively connected each between a corresponding pole of said thyristor bridge and an associated end of said DC-link capacitor for providing a current path between conducting main thyristor switches when the bridge is operating in the forward mode;
first and second GTO switches cross-coupled between a corresponding end of said DC-link capacitor and a corresponding pole of said thyristor bridge;
first means responsive to motor braking for initiating cyclical and alternate control of said first and second GTO switches and for providing a corresponding firing angle for said main thyristor bridge to provide a regenerative mode for bypassing said first and second diode means and for passing said current path through said DC-link capacitor in the opposite direction, thereby to allow energy feedback from said DC terminals through said converter onto said AC input lines; and
second means for inhibiting conduction of said first and second GTO switches during a time interval for each GTO switch so as to define a duty cycle in relation with an unbalance between the voltage input of said inverter and the voltage output of said AC/DC converter, thereby to match said inverter voltage input and said converter voltage output substantially.

* * * * *